US007437950B2

(12) United States Patent
Nakao

(10) Patent No.: US 7,437,950 B2
(45) Date of Patent: Oct. 21, 2008

(54) CORIOLIS FLOW RATE METER WITH FLOW TUBE OF DOUBLE LOOP STRUCTURE

(75) Inventor: Yuichi Nakao, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 11/795,407

(22) PCT Filed: Dec. 5, 2005

(86) PCT No.: PCT/JP2005/022716

§ 371 (c)(1),
(2), (4) Date: Jul. 17, 2007

(87) PCT Pub. No.: WO2007/007424

PCT Pub. Date: Jan. 18, 2007

(65) Prior Publication Data

US 2008/0141788 A1 Jun. 19, 2008

(30) Foreign Application Priority Data

Jul. 12, 2005 (JP) .............................. 2005-202521

(51) Int. Cl.
*G01F 1/84* (2006.01)
(52) U.S. Cl. .................................. 73/861.355
(58) Field of Classification Search ................................. 73/861.355–861.357
See application file for complete search history.

(56) References Cited

U.S. PATENT DOCUMENTS 4,730,501 A * 3/1988 Levien .................. 73/861.357

5,337,616 A * 8/1994 Lew ....................... 73/861.356
2007/0163363 A1* 7/2007 Kitami et al. ........... 73/861.357
2008/0047360 A1* 2/2008 Kitami et al. ........... 73/861.355

FOREIGN PATENT DOCUMENTS

JP 4-157328 5/1992
JP 11-211529 8/1999

* cited by examiner

*Primary Examiner*—Harshad Patel
(74) *Attorney, Agent, or Firm*—Wenderoth, Lind & Ponack, L.L.P.

(57) ABSTRACT

A start tube section (27) of a first bent tube (31) has a first parallel subsection (27a) substantially parallel to a start tube section (28) of a second bent tube (32) or to a continuous section (35) between a return tube section (29) of the first bent tube (31) and the start tube section (28) of the second bent tube (32), a first bent subsection (27b) continuous with the first parallel subsection (27a), and a first start tube section body subsection (27c) extending gradually away from the start tube section (28) of the second bent tube (32) due to presence of the first bent subsection (27b). A return tube section (30) of the second bent tube section (32) has a second parallel subsection (30a) substantially parallel to the return tube section (29) of the first bent tube (31) or to the continuous section (35), a second bent subsection (30b) continuous with the second parallel subsection (30a), and a second return tube section body subsection (30c) extending gradually away from the return tube section (29) of the first bent tube (31) due to presence of the second bent subsection (30b).

2 Claims, 3 Drawing Sheets

CORIOLIS FLOW RATE METER WITH FLOW TUBE OF DOUBLE LOOP STRUCTURE

TECHNICAL FIELD

The present invention relates to a Coriolis flowmeter which detects a phase difference and/or an oscillation frequency proportional to a Coriolis force acting on a flow tube to obtain the mass flow rate and/or density of a fluid to be measured, and more specifically, to a Coriolis flowmeter equipped with a flow tube of a double loop structure.

BACKGROUND ART

A Coriolis flowmeter is a mass flowmeter utilizing the fact that when a flow conduit through which a fluid to be measured flows is supported at one or both ends thereof, and an oscillation in a direction perpendicular to the flowing direction of the flow conduit is applied to a portion of the flow conduit around the support point, the Coriolis force acting on the flow conduit (Hereinafter, the flow conduit to which oscillation is to be applied will be referred to as the flow tube) is proportional to the mass flow rate. The Coriolis flowmeter is well known, and flow tube configurations of the Coriolis flow tube are roughly classified into a straight tube type and a bent tube type.

In the straight tube type Coriolis flowmeter, when an oscillation is applied to the central portion of a straight tube supported at both ends in a direction perpendicular to the straight tube axis, there is obtained, between the support portions and the central portion of the straight tube, a difference in straight tube displacement due to a Coriolis force, that is, a phase difference signal, and a mass flow rate is detected based on this phase difference signal. The straight tube type Coriolis flowmeter has a simple, compact, and firm structure. However, it also has a problem in that it cannot attain high detection sensitivity.

In contrast, the bent tube type Coriolis flowmeter is superior to the straight tube type Coriolis flowmeter in that it is possible to select a configuration for effectively extracting the Coriolis force; in fact, the bent tube type Coriolis flowmeter can detect mass flow rate with high sensitivity. Known examples of the bent tube type Coriolis flowmeter include one equipped with a single flow tube (see, for example, JP 04-55250 B), one equipped with two parallel flow tubes (see, for example, JP 2939242 B), and one equipped with a single looped flow tube (see, for example, JP 05-69453 B).

DISCLOSURE OF THE INVENTION

A Coriolis flowmeter of a structure in which flow tubes undergo oscillation while opposed to each other, as in the case of JP 05-69453 B mentioned above, has an oscillation system of a perfect relative balance. However, the Coriolis flowmeter has the following problem. That is, when the rigidity of a fixing member for fixing the flow tubes is low, or when the distance between the fixed ends of the flow tubes is rather large, oscillation leakage is caused to occur in the longitudinal direction from the zeniths toward the fixed ends of the flow tubes. Due to this oscillation leakage, the energy dissipation ratio varies between the upstream direction and the downstream direction of the flow tubes, so there is a fear of zero-point shift being generated.

The inventor of the present invention has found out that, the above-mentioned oscillation leakage can be mitigated by reducing the distance between the opposing fixed ends of the opposing flow tubes and, at the same time, enhancing the rigidity of the fixed ends of the flow tubes.

As is known in the art, it is most efficient for a driving means and an oscillation detecting means mounted to the flow tubes to be arranged in the loci of the axes of the oscillating flow tubes. Thus, to arrange the driving means and the oscillation detecting means between the opposing flow tubes, it is necessary to enlarge the distance between the flow tubes taking their size into consideration. Here, taking into account what has been found out by the inventor of the present invention as mentioned above, the flow tubes should be of a structure in which the inter-tube distance is relatively enlarged from the fixed ends toward the zeniths.

In the following, the flow tube structure in which the inter-tube distance is relatively enlarged from the fixed ends toward the zeniths will be described with reference to the drawings.

In FIG. 3, reference numeral 1 indicates a flow tube of a double loop structure, and reference numeral 2 indicates a fixing member for fixing the flow tube 1 in position. The flow tube 1 has a first bent tube 3, a second bent tube 4, an inflow tube 5 continuous with the first bent tube 3, and an outflow tube 6 continuous with the second bent tube 4. A fluid to be measured (not shown) flowing through the flow tube 1 flows into a start tube section 7 of the first bent tube 3 from the inflow tube 5, and passes through a zenith portion 8 and a return tube section 9. The fluid flows into a start tube section 11 of the second bent tube 4 from a continuous section 10 between the first bent tube 3 and the second bent tube 4 and, further, passes through a zenith portion 12 and a return tube section 13 to flow into the outflow tube 6.

The flow tube 1 is arranged such that the distance between the start tube section 7 of the first bent tube 3 and the start tube section 11 of the second bent tube 4 increases gradually. Further, the return tube section 9 of the first bent tube 3 and the return tube section 13 of the second bent tube 4 are also arranged such that the distance therebetween increases gradually.

In the flow tube 1 of FIG. 3, bent subsections 14 of the inflow tube 5 and the outflow tube 6 are arranged so as to be barely free from interference with the continuous section 10, and there is generated, between the fixed ends, a distance indicated by reference symbol t. The distance t influences oscillation leakage and can be reduced without involving interference by reducing the diameter of the fixing member 2. However, that would result in a reduction in the rigidity of the sensor as a whole against disturbance oscillation, making it impossible to obtain a stable structure. Further, in some cases, an increase in the outer diameter of the flow tube 1 will make it difficult to perform grooving or boring for holding and fixing the flow tube 1 in position at the fixing member 2.

The present invention has been made in view of the above-mentioned problems in the prior art. It is an object of the present invention to provide a Coriolis flowmeter equipped with a flow tube of a double loop structure contributing to a reduction in oscillation leakage.

As shown in FIG. 1, which is a basic structural view of a sensor unit portion, to achieve the above-mentioned object, there is provided, a Coriolis flowmeter 21 equipped with a flow tube of a double loop structure which is equipped with a flow tube 23 through which a fluid to be measured is passed and a fixing member 24 for fixing the flow tube 23 in position, the flow tube 23 being equipped with: first and second bent tubes 31, 32 opposed to each other and, respectively, having start tube sections 27, 28 extending away from the fixing member 24 and return tube sections 29, 30 extending to return to the fixing member 24; an inflow tube 33 continuous with the first bent tube 31; and an outflow tube 34 continuous with the second bent tube 32. In the Coriolis flowmeter 21, the start tube section 27 of the first bent tube 31 has: a first parallel subsection 27a substantially parallel to the start tube section 28 of the second bent tube 32 or to a continuous section 35 between the return tube section 29 of the first bent tube 31 and the start tube section 28 of the second bent tube 32; a first bent subsection 27b continuous with the first parallel subsection 27a; and a first start tube section body subsection 27c extending gradually away from the start tube section 28 of the second bent tube 32 due to the presence of the first bent subsection 27b, and the return tube section 30 of the second bent tube section 32 has: a second parallel subsection 30a substantially parallel to the return tube section 29 of the first bent tube 31 or to the continuous section 35; a second bent subsection 30b continuous with the second parallel subsection 30a; and a second return tube section body subsection 30c extending gradually away from the return tube section 29 of the first bent tube 31 due to a presence of the second bent subsection 30b.

The Coriolis flowmeter 21 equipped with the flow tube 23 of a double loop structure is characterized in that the tube axes of the return tube section 29 of the first bent tube 31, the continuous section 35, and the start tube section 28 of the second bent tube 32 match with one another, and the tube axes of the first start tube section body subsection 27c and the second return tube section body subsection 30c match with each other.

According to the present invention having the above-mentioned features, it is possible to minimize a distance T on the fixed end side of the flow tube 23 while maintaining the requisite rigidity of the fixing member 24, and to relatively enlarge the inter-tube distance of the flow tube 23 from the fixed end side toward the zenith. Further, in the flow tube 23, it is possible to effect optimum setting of the inter-tube distance on the zenith side. Through optimum setting of the inter-tube distance on the zenith side, it is possible to bring close to each other the components of a driving means 25 and the components of an oscillation detecting means 26 without using any dedicated bracket. Thus, there is not involved any uncertain movement of the forward end of a bracket with deformation of the flow tube 23 due to temperature change, or any surplus additional mass, making it also possible to take oscillation resistance into consideration. On the other hand, by matching the respective tube axes of the different portions of the flow tube 23 with each other, it is possible to form the first and second bent tubes 31, 32 substantially in a mirror-image structure. As a result, it is possible to attain a stable oscillation system.

According to the present invention, it is possible to reduce oscillation leakage in a Coriolis flowmeter equipped with a flow tube of a double loop structure as compared with that in the prior art. Further, it is also possible to improve the temperature characteristic and oscillation resistance of the oscillation system as compared with that in the prior art. Further, it is possible to obtain a more stable oscillation system than that in the prior art.

BEST MODE FOR CARRYING OUT THE INVENTION

Figure 1:
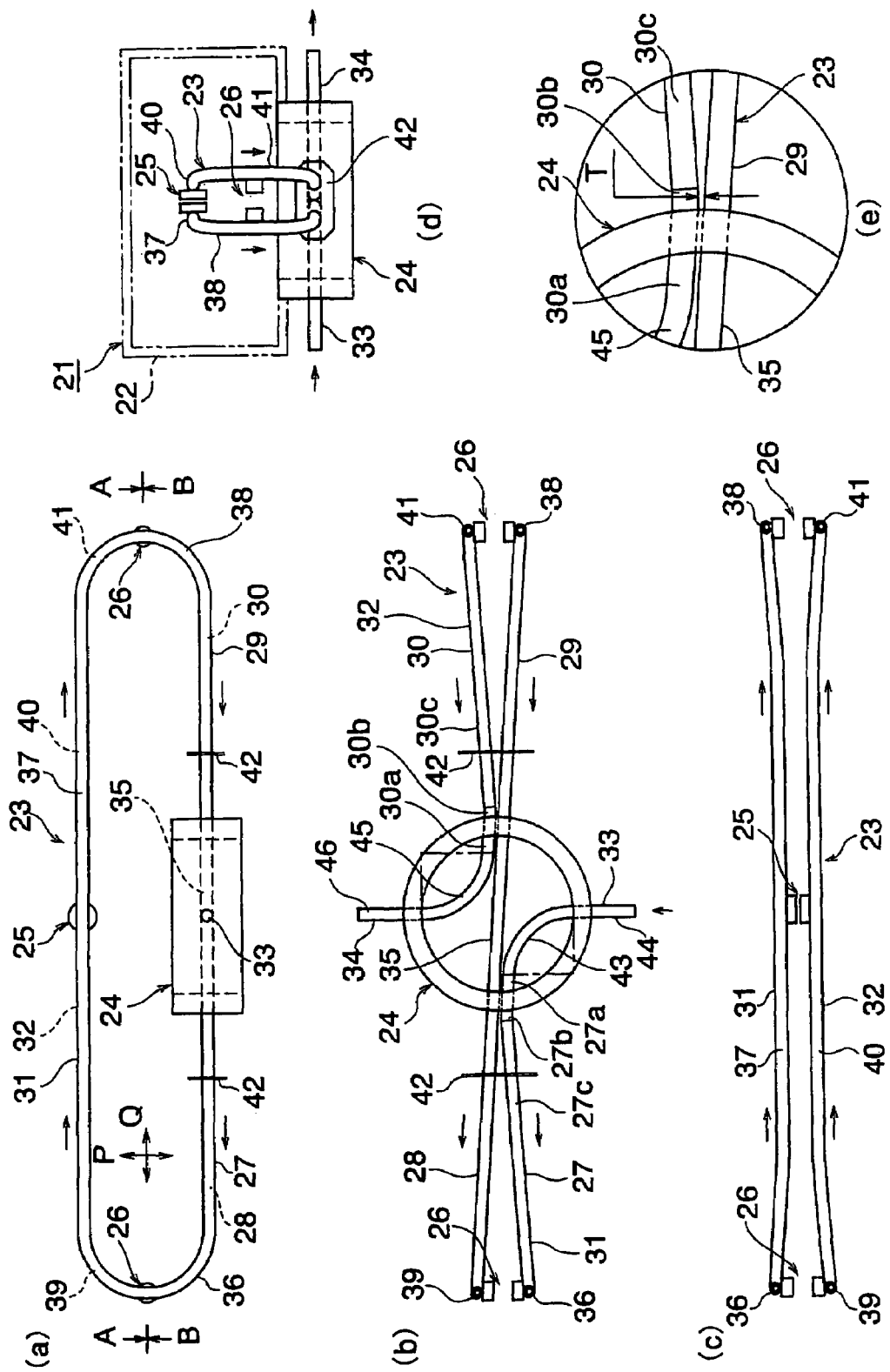
FIG. 1 is a basic structural view of the sensor unit portion of a Coriolis flowmeter according to an embodiment of the present invention, of which portion (a) is a front view, portion (b) is a sectional view taken along the line A-A, portion (c) is a sectional view taken along the line B-B, portion (d) is a side view, and portion (e) is a main portion enlarged view.

In the following, the present invention will be described with reference to the drawings. FIG. 1 is a basic structural view of the sensor unit portion of a Coriolis flowmeter according to an embodiment of the present invention, of which portion (a) is a front view, portion (b) is a sectional view taken along the line A-A, portion (c) is a sectional view taken along the line B-B, portion (d) is a side view, and portion (e) is a main portion enlarged view.

In FIG. 1, the Coriolis flowmeter 21 according to the present invention is equipped with a casing 22, the flow tube 23 accommodated in the casing 22, and the fixing member 24 for fixing the flow tube 23 in position. Further, the Coriolis flowmeter 21 according to the present invention is equipped with: a sensor portion (not shown) having a driving device 25, a pair of oscillation detecting sensors 26, 26, and a temperature sensor (not shown); a signal computation processing portion (not shown) for performing the processing of computing mass flow rate, etc. based on signals from the sensor portion; and an excitation circuit portion (not shown) for exciting the driving device 25. In the following, the above-mentioned components will be described.

The casing 22 has a firm structure resistant to bending and torsion. The casing 22 is of a size allowing accommodation of the flow tube 23, with the fixing member 24 for fixing the flow tube 23 in position mounted thereto. Further, the casing 22 is formed so as to be capable of protecting the main portion of the flowmeter, such as the flow tube 23, that is, the sensor unit portion. The interior of the casing 22 is filled with an inert gas such as argon gas. Due to the filling with the inert gas, it is possible to prevent condensation on the flow tube 23, etc.

Figure 2:
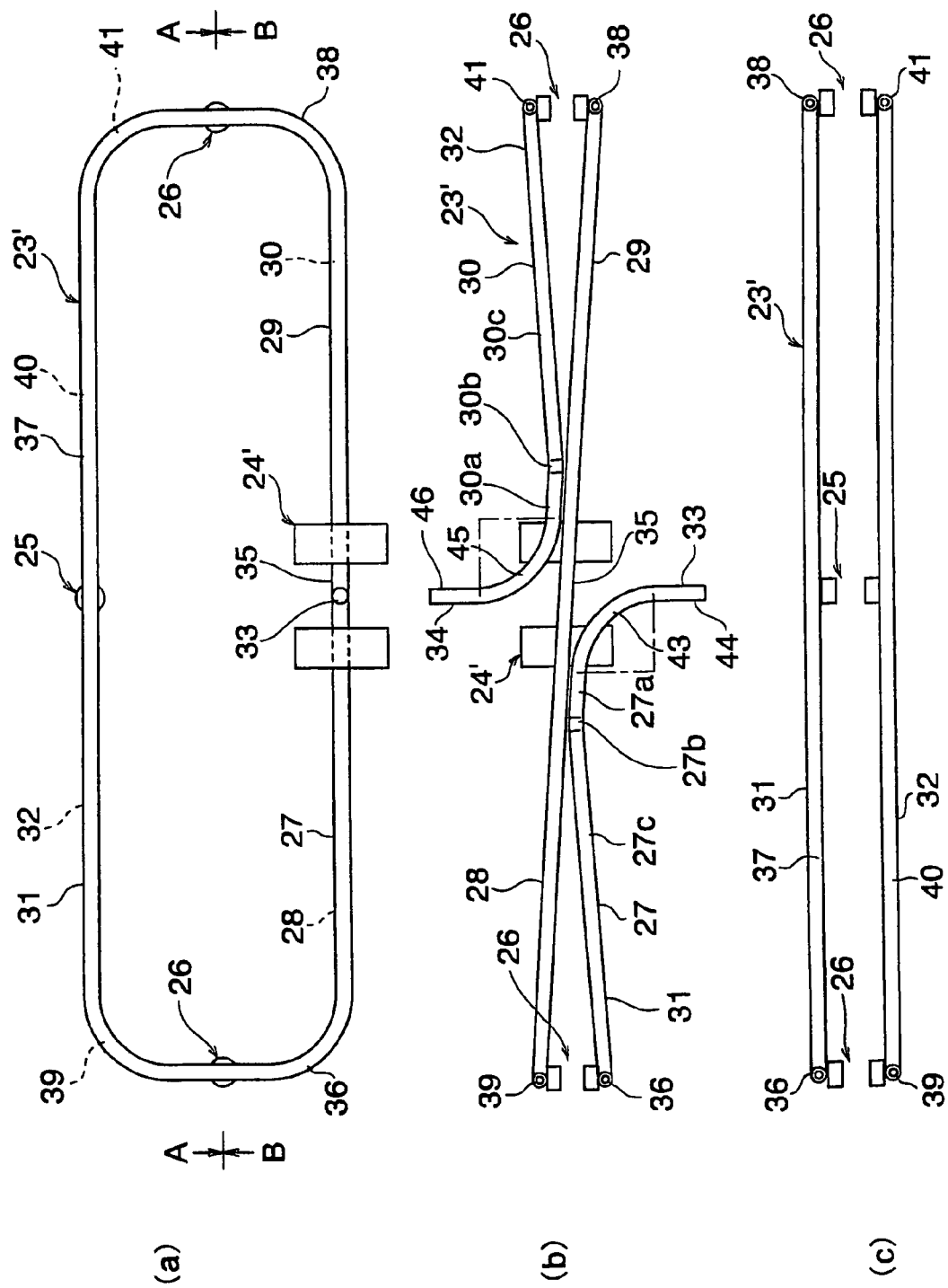
FIG. 2 is a basic structural view of the sensor unit portion of a modification of the flow tube and the fixing member, of which portion (a) is a front view, portion (b) is a sectional view taken along the line A-A, and portion (c) is a sectional view taken along the line B-B.

The casing 22 is mounted to the fixing member 24 by an appropriate means. The fixing member 24 is formed in a circular configuration in plan view (While a circular configuration in plan view is desirable, this should not be construed restrictively. Any other configuration will do as long as a sufficient level of rigidity can be secured. For example, it is also possible to form a fixing member of a rectangular configuration in plan view, or a fixing member 24' as shown in FIG. 2). In this embodiment, the fixing member 24 is formed as an annular wall having a space therein. As the material of the fixing member 24, there is used one usually adopted in this technical field, such as stainless steel.

The flow tube 23 is of a double loop structure formed by looping a single measurement flow tube, and has: the first bent tube 31 and the second bent tube 32 opposed to each other and, respectively, having the start tube sections 27, 28 extending away from the fixing member 24 and the return tube sections 29, 30 extending to return to the fixing member 24; the inflow tube 33 continuous with the first bent tube 31; and the outflow tube 34 continuous with the second bent tube 32. The first bent tube 31 and the second bent tube 32 of the flow tube 23 are connected together by the continuous section 35.

The arrows in the drawing with no reference symbols indicate the flowing direction of the fluid to be measured (not shown) flowing through the flow tube 23. In FIG. 1(a), arrows P indicate the vertical direction, and arrows Q indicate the horizontal direction.

First, the first bent tube 31 and the second bent tube 32 will be described. The first bent tube 31 and the second bent tube 32 are both formed substantially in an elliptical configuration elongated in the horizontal direction. The first bent tube 31 and the second bent tube 32 are formed substantially in a mirror image configuration.

The construction of the first bent tube 31 and the second bent tube 32 will be described in relation to the flowing direction of the fluid to be measured (not shown). The first bent tube 31 has the start tube section 27 continuous with the inflow tube 33, a reverse bent tube section 36 continuous with the start tube section 27 and reversing the flowing direction of the fluid to be measured (not shown), a zenith tube section 37 continuous with the reverse bent tube section 36, a reverse bent tube section 38 continuous with the zenith tube section 37, and the return tube section 29 continuous at one end with the reverse bent tube section 38 and continuous at the other end with the continuous section 35.

On the other hand, the second bent tube 32 has the start tube section 28 continuous with the continuous section 35, a reverse bent tube section 39 continuous with the start tube section 28, a zenith tube section 40 continuous with the reverse bent tube section 39, a reverse bent tube section 41 continuous with the zenith tube section 40, and the return tube section 30 continuous at one end with the reverse bent tube section 41 and continuous at the other end with the outflow tube 34.

The start tube section 27 of the first bent tube 31 has: the first parallel subsection 27a substantially parallel, for example, to the continuous section of the start tube section 28 of the second bent tube 32 and the continuous section 35 (or that of start tube section 28 and continuous section 35); the first bent subsection 27b continuous with the first parallel subsection 27a; and the first start tube section body subsection 27c extending gradually away from the start tube section 28 of the second bent tube 32 due to the presence of the first bent subsection 27b.

The first parallel subsection 27a is of a straight configuration and is arranged and formed such that one end thereof is continuous with the inflow tube 33. In this embodiment, the first parallel subsection 27a is firmly fixed to the fixing member 24. The first parallel subsection 27a is arranged and formed at a limit position where it is barely free from interference with the continuous section of the start tube section 28 and the continuous section 35.

The first bent subsection 27b is arranged and formed so as to be continuous with the other end of the first parallel subsection 27a. In this embodiment, the first bent subsection 27b is arranged and formed precisely at a position where it protrudes from the outer peripheral surface of the fixing member 24. In this embodiment, the first bent subsection 27b is formed such that the straight first start tube section body subsection 27c continuous therewith is inclined by approximately 8° with respect to the start tube section 28 of the second bent tube 32 (This inclination is only given by way of example. In this embodiment, the inclination is set in conformity with the size of the oscillation detecting sensors 26).

Figure 3:
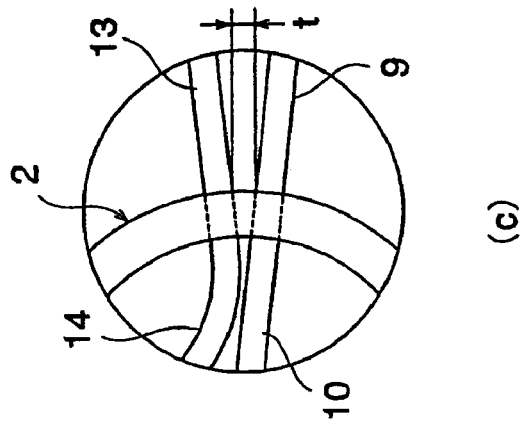
FIG. 3 is a structural view of the sensor unit portion of a conventional Coriolis flowmeter, of which portion (a) is a front view, portion (b) is a sectional view taken along the line C-C, and portion (c) is a main portion enlarged view.
Figure 3:
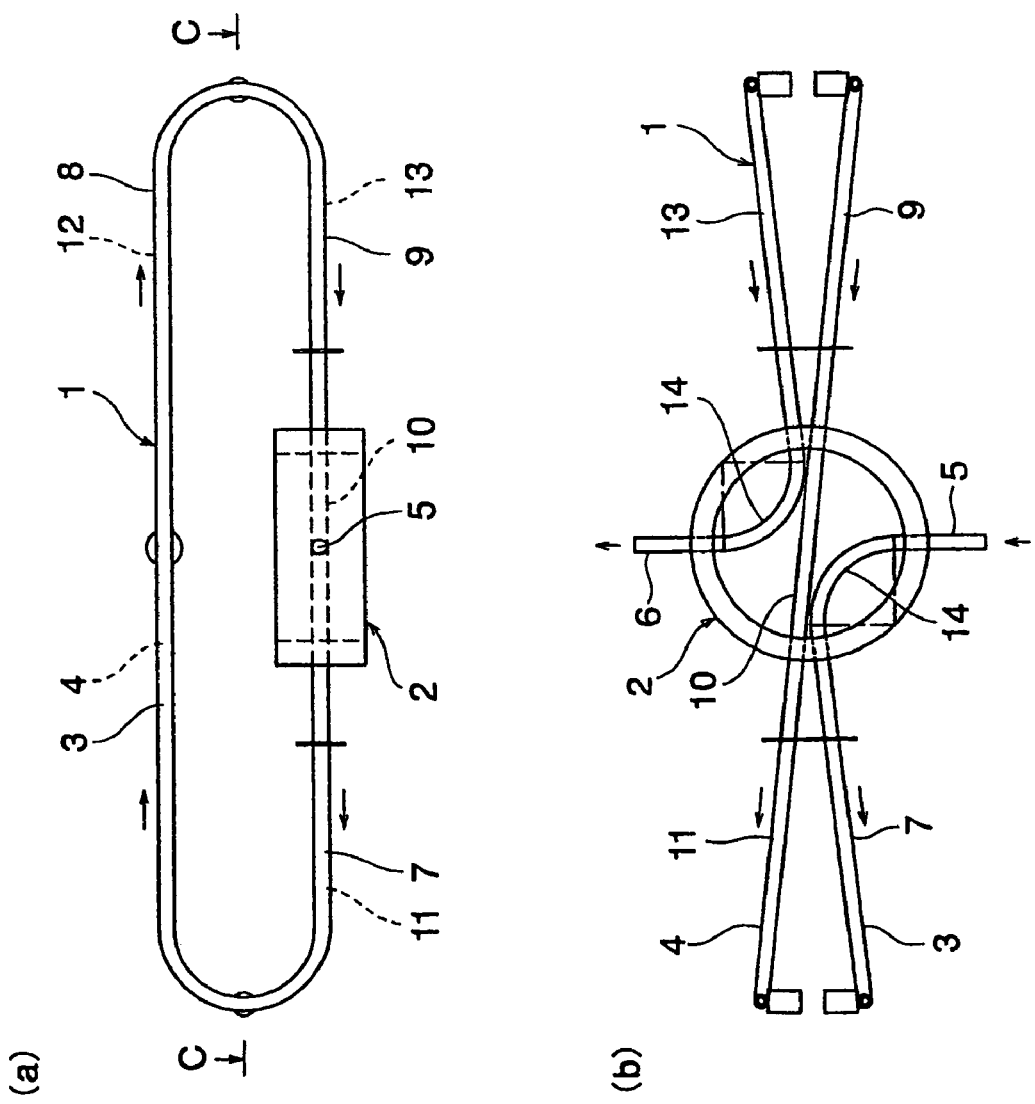

The start tube section 27 of the first bent tube 31 and the start tube section 28 of the second bent tube 32 are, due to the construction of the start tube section 27 of the first bent tube 31, arranged such that the minimum dimension T is attained between the fixed ends (T<t; as for t, see FIG. 3). The first start tube section body subsection 27c forming the start tube section 27 and the start tube section 28 of the second bent tube 32 are fixed by a brace bar 42. The brace bar 42 is a plate-like member astride the two tubes, and is arranged at a position near the fixing member 24. The brace bar 42 is used in order to improve oscillation resistance by deviating from each other the natural frequencies of the in-phase oscillation and the opposite phase oscillation of each oscillation mode of the flow tube 23 making opposing oscillation. Further, the brace bar 42 serves to disperse the stress at the oscillation base, thereby achieving an increase in durability.

The return tube section 30 of the second bent tube 32 has: the second parallel subsection 30a substantially parallel, for example, to the continuous section of the return tube section 29 of the first bent tube 31 and the continuous section 35 (or that of return tube section 29 and continuous section 35); the second bent subsection 30b continuous with the second parallel subsection 30a; and the second return tube section body subsection 30c extending gradually away from the return tube section 29 of the first bent tube 31 due to the presence of the second bent subsection 30b.

The second parallel subsection 30a is of a straight configuration and is arranged and formed such that one end thereof is continuous with the outflow tube 34. In this embodiment, the second parallel subsection 30a is firmly fixed to the fixing member 24. The second parallel subsection 30a is arranged and formed at a limit position where it is barely free from interference with the continuous section of the return tube section 29 and the continuous section 35.

The second bent subsection 30b is arranged and formed so as to be continuous with the other end of the second parallel subsection 30a. In this embodiment, the second bent subsection 30b is arranged and formed precisely at a position where the second bent subsection 30b protrudes from the outer peripheral surface of the fixing member 24. In this embodiment, the second bent subsection 30b is formed such that the straight second return tube section body subsection 30c continuous therewith is inclined by approximately 8° with respect to the return tube section 29 of the first bent tube 31 (This inclination is only given by way of example. In this embodiment, the inclination is set in conformity with the size of the oscillation detecting sensors 26).

The return tube section 30 of the second bent tube 32 and the return tube section 29 of the first bent tube 31 are, due to the construction of the return tube section 30 of the second bent tube 32, arranged such that the minimum dimension T is attained between the fixed ends (T<t; as for t, see FIG. 3). The second return tube section body subsection 30c forming the return tube section 30 and the return tube section 29 of the first bent tube 31 are fixed in the same position by a brace bar 42 which is the same as the one described above.

The return tube section 29 of the first bent tube 31, the continuous section 35, and the start tube section 28 of the second bent tube 32 are formed such that their tube axes match with each other. Similarly, the first start tube section body subsection 27c of the first bent tube 31 and the second return tube section body subsection 30c of the second bent tube 32 are formed such that their tube axes match with each other. In this embodiment, the return tube section 29 of the first bent tube 31 and the start tube section 28 of the second bent tube 32 are firmly fixed to the fixing member 24.

In this embodiment, the zenith tube sections 37 and 40 of the first bent tube 31 and the second bent tube 32, respectively, are formed in the configuration as shown in the drawing, in which their middle sections are brought close to each other in conformity with the size of the driving device 25 (This is given only by way of example; they may also be formed straight, with their middle sections not being brought close to each other). The central positions of the zenith tube sections 37 and 40 constitute the mounting portions for the driving device 25. Further, the respective central positions of the reverse bent tube sections 36 and 39 and of the reverse bent tube sections 38 and 41, arranged parallel to each other, constitute the mounting portions for the oscillation detecting sensors 26.

The inflow tube 33 has a bent section 43 continuous with the first parallel subsection 27a of the first bent tube 31, and a straight inflow tube body 44 continuous with the bent section 43. Similarly, the outflow tube 34 has a bent section 45 continuous with the second parallel subsection 30a of the second bent tube 32, and a straight outflow tube body 46 continuous with the bent section 45. The inflow tube 33 and the outflow tube 34 are formed in the same configuration. The inflow tube body 44 of the inflow tube 33 and the outflow tube body 46 of the outflow tube 34 are arranged such that their tube axes match with each other. Further, in this embodiment, the inflow tube body 44 of the inflow tube 33 and the outflow tube body 46 of the outflow tube 34 are firmly fixed to the fixing member 24.

In this embodiment, the start tube section 27 and the return tube section 29 of the first bent tube 31, the start tube section 28 and the return tube section 30 of the second bent tube 32, the inflow tube 33, and the outflow tube 34 are fixed in position in the same plane (This layout is only given by way of example).

In the flow tube 23, the distance between the fixed ends is very small, so oscillation leakage does not easily occur. Further, although not illustrated in detail, the flow tube 23 is constructed such that the torsional stresses generated in the first bent tube 31 and the second bent tube 32 are cancelled. That is, substantially no oscillation is generated in the fixing member 24. On the other hand, in the flow tube 23, the distance between the zenith tube sections 37 and 40 is small, so the deviation in the positional relationship generated in the driving device 25 due to temperature and oscillation is minimum. Similarly, in the oscillation detecting sensors 26, 26, the deviation in positional relationship due to temperature and oscillation is minimum.

Regarding the material of the flow tube 23, there is used one usually adopted in this technical field, such as stainless steel, hastelloy, or titanium alloy.

The driving device 25 constituting the sensor portion serves to cause the first bent tube 31 and the second bent tube 32 of the flow tube 23 to make opposing oscillation, and is equipped with a coil and a magnet. The driving device 25 is arranged at the central positions of the zenith tube sections 37 and 40 of the flow tube 23 so as to be held therebetween. In other words, the driving device 25 is mounted at a position not offset with respect to the oscillating direction of the flow tube 23.

The coil of the driving device 25 is mounted to the zenith tube section 37 of the flow tube 23 by using a dedicated mounting instrument (which is not the bracket mentioned below). Further, although not shown in particular, a flexible print circuit (FPC) or an electric wire is led out from the coil. The magnet of the driving device 25 is mounted to the zenith tube section 40 of the flow tube 23 by using a dedicated mounting instrument (The arrangement of the coil and the magnet may be reversed from the one described above).

When an attracting action is generated in the driving device 25, the magnet is inserted into the coil, with the result that the zenith tube sections 37 and 40 of the flow tube 23 are brought close to each other. In contrast, when a repulsive action is generated, the zenith tube sections 37 and 40 are moved away from each other. Since the flow tube 23 is fixed to the fixing member 24 as described above, the driving device 25 drives the flow tube 23 alternately in a rotating direction around the fixing member 24.

The oscillation detecting sensors 26, 26 constituting the sensor portion are sensors for detecting oscillation of the flow tube 23 and detecting a phase difference proportional to the Coriolis force acting on the flow tube 23, with each sensor being equipped with a coil and a magnet (The oscillation detecting sensors are not restricted to the above-mentioned ones; other types of sensor capable of detecting any one of displacement, speed, and acceleration will do. For example, it is also possible to employ an acceleration sensor, an optical means, a capacitance type sensor, or a distortion type (piezoelectric type) sensor).

The oscillation detecting sensors 26, 26, constructed as described above, are arranged at positions where they can detect a phase difference proportional to the Coriolis force. In this embodiment, the oscillation detecting sensors 26, 26 are arranged at the respective central positions of the reverse bent tube sections 36 and 39, and the reverse bent tube sections 38 and 41, arranged parallel to each other.

The coils of the oscillation detecting sensors 26, 26 are mounted to the reverse bent tube sections 39 and 41 of the flow tube 23 by using a dedicated mounting instrument. Although not shown in particular, a flexible print circuit (FPC) or an electric wire is led out from each coil. Further, the respective magnets of the oscillation detecting sensors 26, 26 are mounted to the reverse bent tube sections 36 and 38 by using a dedicated mounting instrument.

Although not shown in particular, a board or the like is provided inside the Coriolis flowmeter 21 shown in FIG. 1. Connected to this board is a wire harness led out of the casing 22. Further, connected to the board are the FPCs or electric wires from the driving device 25 and the oscillation detecting sensors 26, 26.

The temperature sensor constituting a part of the sensor portion serves to effect temperature compensation on the Coriolis flowmeter 21, and is mounted to the flow tube 23 by an appropriate means. More specifically, the temperature sensor is mounted, for example, to the return tube section 29 of the first bent tube 31. A flexible print circuit (FPC) or an electric wire led out of the temperature sensor is connected to the board.

Wiring and connection are effected in the signal computation processing portion so as to allow input of a detection signal regarding deformation of the flow tube 23 supplied from one oscillation detecting sensor 26, a detection signal regarding deformation of the flow tube 23 supplied from the other oscillation detecting sensor 26, and a detection signal regarding the temperature of the flow tube 23 supplied from the temperature sensor. This signal computation processing portion is constructed so as to compute mass flow rate and density based on the detection signals input from the sensor portion. Further, the signal computation processing portion is constructed such that the mass flow rate and density obtained through computation are output to a display device (not shown).

The excitation circuit portion is equipped with a smoothing portion, a comparing portion, a target setting portion, a variable amplification portion, and a drive output portion. Wiring is effected in the smoothing portion such that the detection signal from one oscillation detecting sensor 26 (or the other oscillation detecting sensor 26) is extracted. Further, this smoothing portion has the function of rectifying and smoothing the input detection signal and outputting a DC voltage proportional to the amplitude thereof. The comparing portion has the function of comparing the DC voltage from the smoothing portion with a target set voltage output from the target setting portion and controlling the gain of the variable amplification portion to control the amplitude of a resonant oscillation to the target set voltage.

With the above-mentioned construction, when the fluid to be measured (not shown) is caused to flow through the flow tube 23, and the driving device 25 is driven to cause the first bent tube 31 and the second bent tube 32 of the flow tube 23 to make opposing oscillation, the mass flow rate is calculated by the signal computation processing portion from the phase difference generated by the Coriolis force at the position of the oscillation detecting sensors 26, 26. Further, in this embodiment, the density is also calculated from the oscillation frequency.

Next, a modification of the flow tube and the mixing member will be described with reference to FIG. 2. FIG. 2 is a basic structural view of the sensor unit portion of a modification of the flow tube and the fixing member, of which portion (a) is a front view, portion (b) is a sectional view taken along the line A-A, and portion (c) is a sectional view taken along the line B-B.

In FIG. 2, a Coriolis flowmeter according to the present invention is equipped with: a sensor portion (not shown) having a casing (which is not shown, here, it is the same as that of FIG. 1 indicated by reference numeral 22), a flow tube 23' accommodated in the casing, a fixing member 24' for fixing the flow tube 23' in position, a sensor portion (not shown) having the driving device 25, the pair of oscillation detecting sensors 26, 26, and a temperature sensor (not shown); a signal computation processing portion (not shown) for performing the processing of computing mass flow rate, etc. based on signals from this sensor portion; and an excitation circuit portion (not shown) for exciting the driving device 25. The Coriolis flowmeter differs from that of the above-mentioned embodiment in the construction of the flow tube 23' and of the fixing member 24' (The operation of the sensor unit portion is the same as that of the above embodiment).

The following description will center only on the differences.

The start tube section 27 forming the first bent tube 31 of the flow tube 23' has the first parallel subsection 27a, the first bent subsection 27b, and the first start tube section body subsection 27c, with the first parallel subsection 27a being arranged and formed precisely at a position where it protrudes from the outer peripheral surface of the fixing member 24'. On the other hand, the return tube section 30 forming the second bent tube 32 has the second parallel subsection 30a, the second bent subsection 30b, and the second return tube section body subsection 30c, with the second parallel subsection 30a being also arranged and formed precisely at a position where it protrudes from the outer peripheral surface of the fixing member 24'. The fixing member 24' is formed in a block shape as shown in FIG. 2.

Apart from this, although no primes are particularly added to their reference numerals, the reverse bent tube sections 36 and 39, and the reverse bent tube sections 38 and 41 have configurations somewhat different from those of the above embodiment. Further, this modification differs from the above embodiment in that the zenith tube sections 37 and 40 have a straight configuration.

According to the present invention described above, it is possible to reduce the distance between the fixed end sides of the flow tube 23 (23') as compared with that in the prior art while maintaining the same rigidity as that of the prior art for the fixing member 24 (24'). Thus, it is possible to mitigate oscillation leakage, which has been a problem in the prior art. Further, according to the present invention, it is possible to relatively enlarge the inter-tube distance from the fixed end side toward the zenith of the flow tube 23 (23'). In the flow tube 23 (23'), it is possible to optimize the inter-tube distance on the zenith side. Thus, it is possible to bring the driving device 25 and the oscillation detecting sensors 26, 26 close to each other without using a dedicated bracket. As a result, there is no uncertain movement of the bracket forward end with deformation of the flow tube 23 (23') due to a temperature change, and no surplus additional mass, thus making it possible to take oscillation resistance into consideration. On the other hand, by matching the tube axes of the different portions of the flow tube 23 (23') with each other, it is possible to form the first and second bent tubes 31, 32 substantially in a mirror-image structure. Thus, it is possible to stabilize the oscillation system.

It goes without saying that, apart from the above, the present invention allows various modifications without departing from the gist of the invention.

The invention claimed is:

1. A Coriolis flowmeter equipped with a flow tube of a double loop structure, which is equipped with a flow tube through which a fluid to be measured is passed and with a fixing member for fixing the flow tube in position, the flow tube being equipped with first and second bent tubes opposed to each other and each having a start tube section extending away from the fixing member and a return tube section extending to return to the fixing member, an inflow tube continuous with the first bent tube, and an outflow tube continuous with the second bent tube, wherein the start tube section of the first bent tube has a first parallel subsection substantially parallel to the start tube section of the second bent tube or to a continuous section between the return tube section of the first bent tube and the start tube section of the second bent tube, a first bent subsection continuous with the first parallel subsection, and a first start tube section body subsection extending gradually away from the start tube section of the second bent tube due to presence of the first bent subsection, and wherein the return tube section of the second bent tube section has a second parallel subsection substantially parallel to the return tube section of the first bent tube or to the continuous section, a second bent subsection continuous with the second parallel subsection, and a second return tube section body subsection extending gradually away from the return tube section of the first bent tube due to presence of the second bent subsection.

2. A Coriolis flowmeter equipped with a flow tube of a double loop structure according to claim 1, wherein tube axes of the return tube section of the first bent tube, the continuous section, and the start tube section of the second bent tube match with one another, and wherein tube axes of the first start tube section body subsection and the second return tube section body subsection match with each other.

* * * * *